United States Patent
Lee et al.

(10) Patent No.: US 9,884,559 B2
(45) Date of Patent: Feb. 6, 2018

(54) DEVICE AND METHOD FOR CONTROLLING A HIGH SIDE DC/DC CONVERTER OF A HYBRID VEHICLE

(71) Applicant: Hyundai Motor Company, Seoul (KR)

(72) Inventors: Youn Sik Lee, Gyeonggi-do (KR);
Sang Cheol Shin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 251 days.

(21) Appl. No.: 14/945,687

(22) Filed: Nov. 19, 2015

(65) Prior Publication Data

US 2016/0347185 A1    Dec. 1, 2016

(30) Foreign Application Priority Data

May 27, 2015  (KR) .................. 10-2015-0073788

(51) Int. Cl.
*B60L 11/18* (2006.01)
*H02M 3/158* (2006.01)

(52) U.S. Cl.
CPC ........... *B60L 11/18* (2013.01); *H02M 3/1588* (2013.01); *Y02B 70/1466* (2013.01)

(58) Field of Classification Search
CPC .. B60L 11/18; B60L 11/1803; B60L 11/1809; B60L 11/1811; H02M 3/1582; H02M 3/1588; Y02B 70/1466
USPC .................................................. 307/9.1, 10.1
See application file for complete search history.

(56) References Cited

U.S. PATENT DOCUMENTS

| | | | | |
|---|---|---|---|---|
| 2009/0128117 A1* | 5/2009 | Ochiai | ................ | B60L 11/1851 323/299 |
| 2013/0009464 A1* | 1/2013 | Firehammer | ....... | H01M 10/425 307/9.1 |
| 2016/0065057 A1* | 3/2016 | McLean | ............ | H01M 8/04373 307/52 |
| 2017/0187288 A1* | 6/2017 | Wada | ..................... | H02M 3/158 |
| 2017/0257027 A1* | 9/2017 | Yamamoto | ............ | H02M 3/158 |

FOREIGN PATENT DOCUMENTS

| | | |
|---|---|---|
| JP | 2013-115931 A | 6/2013 |
| JP | 2015-004623 | 1/2015 |
| KR | 10-2011-0082355 | 7/2011 |
| KR | 10-2012-0037701 A | 4/2012 |
| KR | 10-2014-0011326 | 9/2012 |

* cited by examiner

*Primary Examiner* — William Hernandez
(74) *Attorney, Agent, or Firm* — Mintz Levin Cohn Ferris Glovsky and Popeo, P.C.; Peter F. Corless

(57) ABSTRACT

A device and a method for controlling a high side DC/DC converter (HDC) of a hybrid vehicle are provided. The switching frequency of the HDC is variably adjusted based on situations of temperatures of an inductor and an IGBT switching element, which constitute the HDC, to maintain a balance between the temperatures of the inductor and the IGBT switching element. Accordingly, temperatures of the inductor and the IGBT switching element are detected, and the switching frequency of the HDC is variably adjusted based on a situation for each temperature of each element to maintain a balance between the temperatures of the inductor and the IGBT switching element, thereby improving the utilization rate of the IGBT switching element.

14 Claims, 4 Drawing Sheets

DEVICE AND METHOD FOR CONTROLLING A HIGH SIDE DC/DC CONVERTER OF A HYBRID VEHICLE

CROSS-REFERENCE TO RELATED APPLICATION

This application claims under 35 U.S.C. § 119(a) the benefit of Korean Patent Application No. 10-2015-0073788 filed on May 27, 2015, the entire contents of which are incorporated herein by reference.

BACKGROUND (a) Technical Field

The present invention relates to a device and a method for controlling a high side direct current/direct current (DC/DC) converter of a hybrid vehicle. More particularly, the present invention relates to a device and a method for controlling a high side DC/DC converter of a hybrid vehicle, in which the switching frequency of the high side DC/DC converter is variably adjusted based on temperatures of an inductor and an insulated-gate bipolar transistor (IGBT) switching element, which constitute the high side DC/DC converter, thereby maintaining a balance between the temperatures of the inductor and the IGBT switching element.

(b) Background Art

To maximize the efficiency of a drive motor of an eco-friendly vehicle such as a hybrid vehicle or an electric vehicle, a method of driving a motor is changed from a method of driving a motor by directly converting a voltage of a high-voltage battery using an inverter to a method of driving a motor using an inverter by primarily increasing energy of a high-voltage battery using a high side DC/DC converter. Accordingly, a high side DC/DC converter (hereinafter, referred to as a HDC) for primarily increasing a voltage of a high-voltage battery and applying the increased voltage to an inverter is mounted within a plug-in hybrid vehicle, an electric vehicle, etc., of which demand has recently been increased. The HDC is configured with several types of semiconductor elements such as an inductor and an IGBT to increase the operating voltage of a drive motor.

Referring to FIG. 1, the HDC is a boost circuit disposed between a high-voltage battery 10 and an inverter 30 for motor drive control. The HDC includes an inductor 22 connected to an output terminal of the high-voltage battery 10, and an upper IGBT switching element 24 and a lower IGBT switching element 26, which switch current flowing through the inductor 22.

The HDC 20 operates as a boost converter when a driving voltage is supplied to a motor through the inductor 22, and operates as a buck converter for charging the high-voltage battery 10 when regenerative braking is performed. The switching operation of the HDC 20 is performed by applying PWM signals inverted to each other to gates of the respective upper and lower IGBT switching elements 24 and 26.

In particular, switching loss occurs in switching on/off operations of the upper and lower IGBT switching elements. When the motor is driven, switching loss occurs in the lower IGBT switching element. When regenerative braking is performed, the switching loss occurs in the upper IGBT switching element. The switching loss increases as the switching frequency of the HDC increases. Further, the amount of loss occurring in driving of the IGBT switching element of the HDC increases the temperature of the IGBT switching element. As the amount of loss occurring in the IGBT switching element increases, the number of IGBT switching elements to be driven should increase. Furthermore, unit cost increases by the increased number of IGBT switching elements.

Meanwhile, accordingly the related art, a method of decreasing a switching frequency is used as the method reducing the amount of switching loss occurring in the IGBT switching element. When the switching frequency is decreased, the amplitude of ripple current of the inductor increases, which causes the inductor to generate heat.

SUMMARY

The present invention provides a device and a method for controlling an HDC of a hybrid vehicle, in which temperatures of an inductor and an IGBT switching element, which constitute the HDC, are detected, and the switching frequency of the HDC is variably adjusted based on a situation for each temperature of each element, to maintain a balance between the temperatures of the inductor and the IGBT switching element, thereby improving the utilization rate of the IGBT switching element.

In one aspect, the present invention provides a device for controlling an HDC of a hybrid vehicle which may include: an HDC including an inductor connected to an output terminal of a high-voltage battery, and an upper IGBT switching element and a lower IGBT switching element, which switch current flowing through the inductor; an element temperature sensing unit having a first temperature sensor configured to sense a temperature of the inductor, a second temperature sensor configured to sense a temperature of the lower IGBT switching element, and a third sensor configured to sense a temperature of the upper IGBT switching element; and a controller configured to receive temperature sensing values of the first to third temperature sensors, and in response to detecting a variation in temperature between the inductor and each IGBT switching element, adjust a switching frequency of the IGBT switching element to be increased or decreased to maintain a balance between the temperatures of the inductor and each IGBT switching element.

In an exemplary embodiment, the lower IGBT switching element may be used for a boost mode of the converter, and the upper IGBT switching element may be used for a buck mode of the converter. In addition, when the temperature of the lower IGBT switching element, sensed by the second temperature sensor, or the temperature of the upper IGBT switching element, sensed by the third temperature sensor, is greater than the temperature of the inductor, sensed by the first temperature sensor, the controller may be configured to decrease the switching frequency to a predetermined level.

Further, when the temperature of the inductor, sensed by the first temperature sensor, is greater than the temperature of the lower IGBT switching element, sensed by the second temperature sensor, or the temperature of the upper IGBT switching element, sensed by the third temperature sensor, the controller may be configured to increase the switching frequency to a predetermined level.

In another aspect, the present invention provides a method for controlling an HDC of a hybrid vehicle which may include: sensing temperatures of a lower IGBT switching element and an upper IGBT switching element, in addition to a temperature of an inductor of an HDC; and in response to detecting a variation in temperature between the inductor and each IGBT switching element, adjusting a switching frequency of the IGBT switching element to be increased or decreased to maintain a balance between the temperatures of the inductor and each IGBT switching element.

In the adjusting of the switching frequency, when the temperature of the lower IGBT switching element or the temperature of the upper IGBT switching element is greater than the temperature of the inductor, the switching frequency may be decreased to a predetermined level to decrease the temperature of each IGBT switching element. When the switching frequency is decreased to the predetermined level, the switching frequency may be fixed to a minimum value within a critical frequency range, in consideration of output ripples of the converter.

Further, in the adjusting of the switching frequency, when the temperature of the inductor is greater than the temperature of the lower IGBT switching element or the temperature of the upper IGBT switching element, the switching frequency may be increased to a predetermined level to decrease the temperature of the inductor. When the switching frequency is adjusted to be increased to the predetermined level, the switching frequency may be fixed to a maximum value within the critical frequency range, in consideration of a switching speed of each IGBT switching element.

As described above, the present invention provides advantages as follows.

First, the temperatures of the inductor and the IGBT switching elements, which constitute the HDC, may be detected. In response to detecting a variation in temperature between the inductor and the IGBT switching element, the switching frequency of the HDC may be variably adjusted to maintain a balance between the temperatures of the inductor and the IGBT switching element. Accordingly, it may be possible to maintain proper use temperatures of the inductor and the IGBT switching element, thereby improving the utilization rate of the IGBT switching element.

Second, as the proper use temperatures of the inductor and IGBT switching element are maintained, it may be possible to prevent heat from being generated in the inductor and to reduce switching loss of the IGBT switching element.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
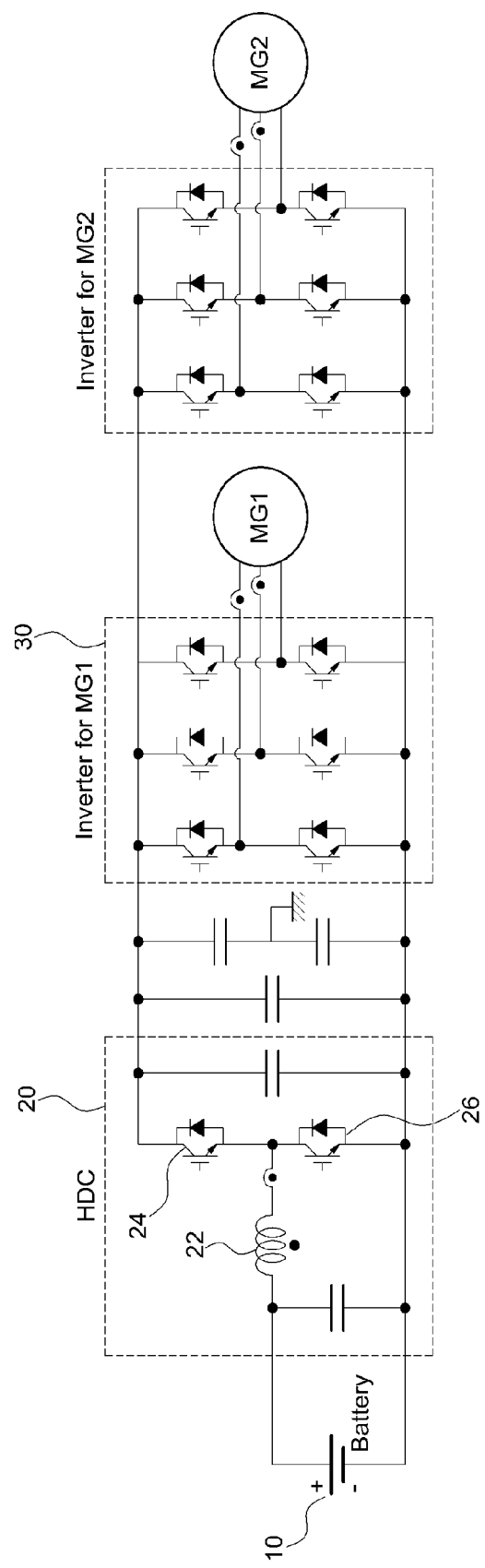
FIG. 1 is a circuit diagram illustrating a relationship between an inverter and an HDC of a hybrid vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The maximum output of a motor for driving a hybrid vehicle is generated within about 10 seconds, and an HDC may be configured to increase power of a high-voltage battery during this time. In particular, the temperature of an IGBT switching element of the HDC is immediately saturated, but the temperature of an inductor of the HDC is not immediately saturated.

Figure 2:
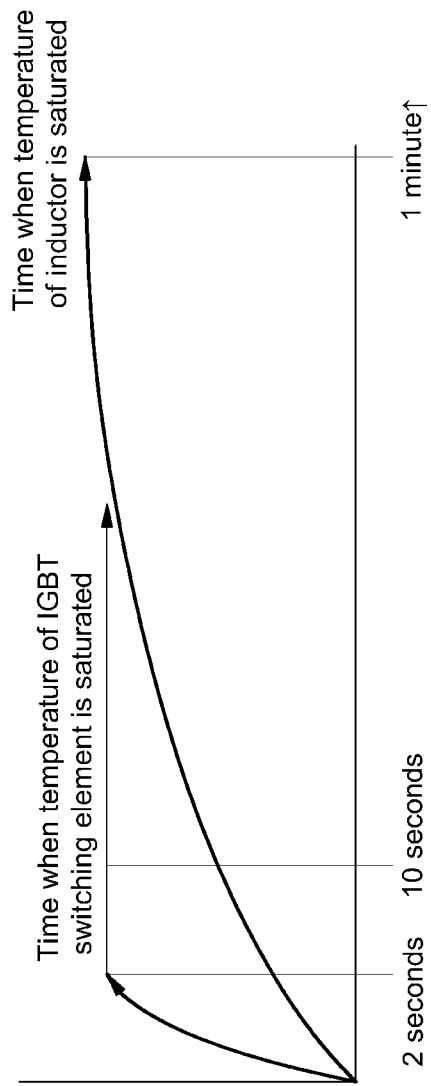
FIG. 2 is a graph illustrating temperature saturation times of an IGBT switching element and an inductor, which constitute an HDC of a hybrid vehicle according to the related art.

Referring to FIG. 2 of the related art, illustrating thermal curves of the inductor and the IGBT switching element of the HDC in sudden start of the vehicle for 10 seconds, i.e., in the maximum output of the motor for driving the vehicle, the temperature of the IGBT switching element increases to 40° C. for about 10 seconds when the state of the motor enters into a maximum output state from a continuous output state. However, the temperature of the inductor increases to only about 15° C.

Particularly, the temperature of the inductor is not immediately saturated since the thermal capacity of the inductor is substantial, and accordingly, the temperature of the inductor does not rapidly increase, unlike the IGBT switching element. In consideration that the time when the temperature of an inductor is saturated is greater than the time when the temperature of an IGBT switching element is saturated, in the present invention, the switching frequency of an HDC may be variably adjusted based on situations of temperatures of an inductor and an IGBT switching element, which constitute the HDC, to maintain a balance between the temperatures of the inductor and the IGBT switching element, thereby improving the utilization rate of the IGBT switching element. A device and a method for controlling an HDC of a hybrid vehicle according to the present invention will be described as follows.

Figure 3:
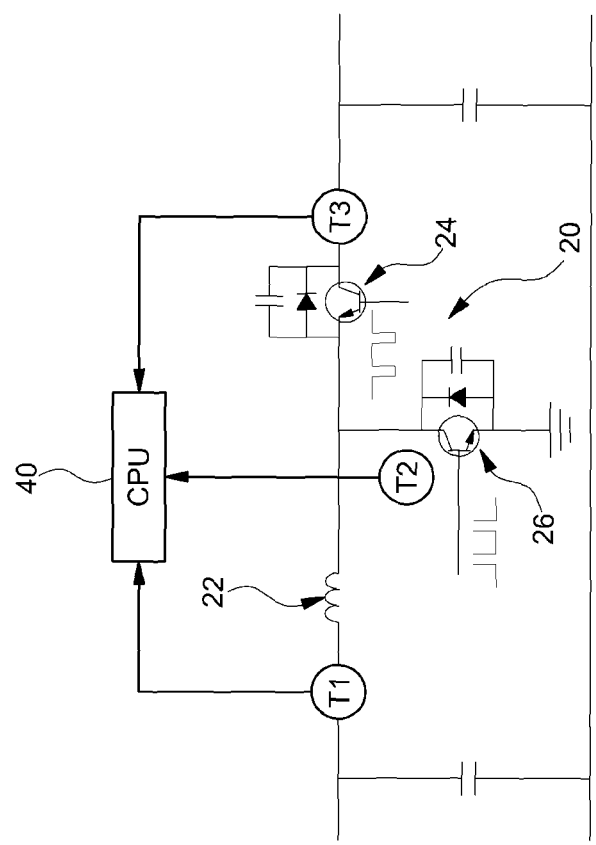
FIG. 3 is a circuit diagram illustrating a device for controlling an HDC of a hybrid vehicle according to an exemplary embodiment of the present invention.
Figure 4:
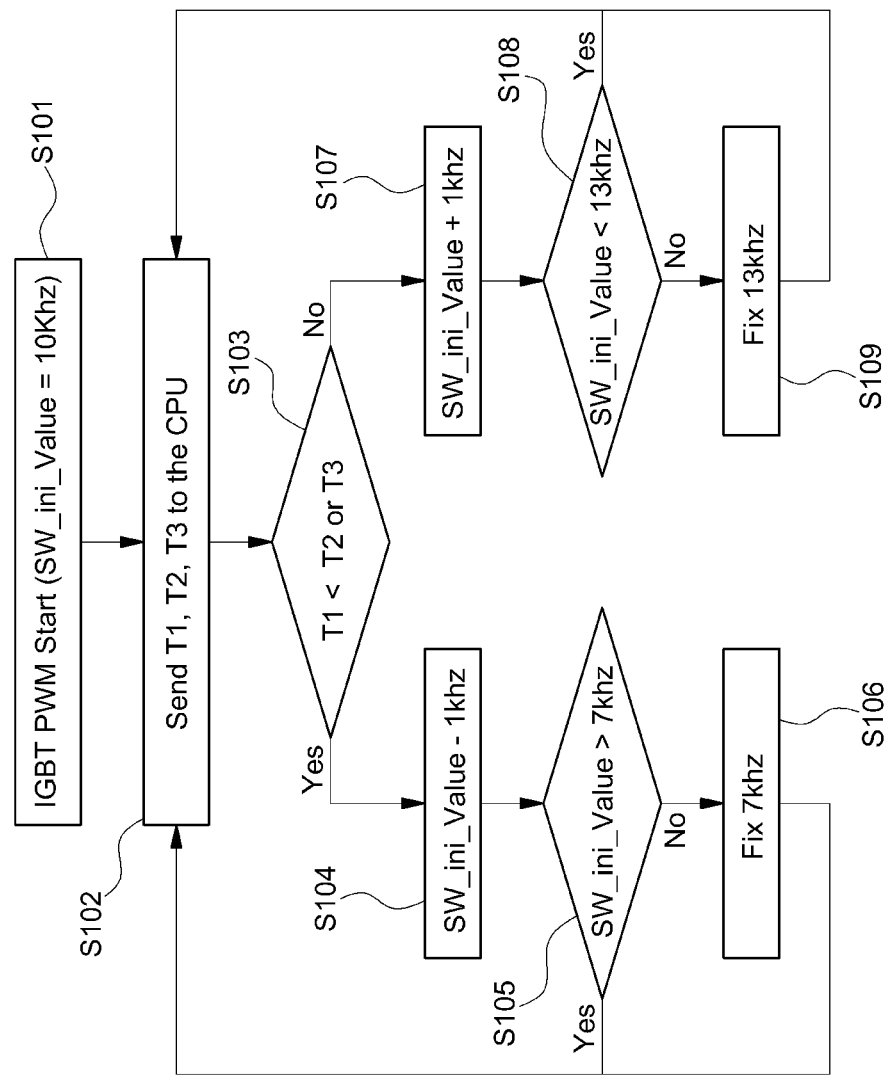
FIG. 4 is a flowchart illustrating a method for controlling the HDC of the hybrid vehicle according to an exemplary embodiment of the present invention.

FIG. 3 is a circuit diagram illustrating a device for controlling an HDC of a hybrid vehicle according to an exemplary embodiment of the present invention. FIG. 4 is a flowchart illustrating a method for controlling an HDC of a hybrid vehicle according to an exemplary embodiment of the present invention. As shown in FIG. 3, an HDC 20, i.e., a high side DC/DC converter may include an inductor 22, and an upper IGBT switching element 24 and a lower IGBT switching element 26, which switch current flowing through the inductor 22.

The HDC 20 may be configured to operate as a boost converter when a driving voltage is supplied to a motor, and operate as a buck converter for charging a high-voltage battery when regenerative braking is performed. Accordingly, the lower IGBT switching element 26 may be used for a boost mode of the converter, and the upper IGBT switching element 24 may be used for a buck mode of the converter. In particular, an element temperature sensing unit configured to sense temperatures of the inductor 22 and the IGBT switching elements 24 and 26 may be disposed within the HDC 20.

More specifically, the element temperature sensing unit may include a first temperature sensor T1 configured to sense a temperature of the inductor 22, a second temperature sensor T2 configured to sense a temperature of the lower IGBT switching element 26, and a third temperature sensor T3 configured to sense a temperature of the upper IGBT switching element 24. Additionally, temperature sensing values of the first to third temperature sensors, T1 to T3, may be input in real time to a controller 40.

The controller 40 may be configured to receive temperature sensing values of the first to third temperature sensors, T1 to T3. Further, in response to determining a variation in temperature between the inductor 22 and each of the IGBT switching elements 24 and 26, the controller 40 may be configured to increase or decrease the switching frequency of the IGBT switching element to maintain a balance between the temperatures of the inductor 22 and each of the IGBT switching elements 24 and 26.

When the temperature of the lower IGBT switching element 26, sensed by the second temperature sensor T2, or the temperature of the upper IGBT switching element 24, sensed by the temperature sensor T3, is greater than the temperature of the inductor 22, sensed by the first temperature sensor T1, the controller 40 may be configured to decrease the temperature of the IGBT switching element by decreasing the switching frequency to a predetermined level.

Furthermore, since the amount of switching loss occurring in driving of each of the IGBT switching elements 24 and 26 of the HDC 20 increases the temperature of the IGBT switching element, and since the temperature of each of the IGBT switching elements 24 and 26 is greater than the temperature of the inductor 22, the temperature of the IGBT switching element may be increased based on an amount of switching loss. Thus, the switching frequency may be decreased to a predetermined level, thereby decreasing the temperature of the IGBT switching element.

When the temperature of the inductor 22, sensed by the first temperature sensor T1 is greater than the temperature of the lower IGBT switching element 26, sensed by the second temperature sensor T2, or the temperature of the upper IGBT switching element 24, sensed by the temperature sensor T3, the controller 40 may be configured to decrease the temperature of the inductor 22 by increasing the switching frequency to a predetermined level.

Moreover, a method of decreasing a switching frequency may be used as the method for reducing the amount of switching loss occurring in the IGBT switching element. When the switching frequency is decreased, the amplitude of ripple current of the inductor increases, which causes the inductor to generate heat. Accordingly, since the temperature of the inductor 22 is greater than the temperature of the lower IGBT switching element 26 or the upper IGBT switching element 24, heat may be generated in the inductor due to a decrease in switching frequency. Thus, the switching frequency may be increased to a predetermined level, thereby decreasing the temperature of the inductor.

Hereinafter, a method for controlling the HDC of the hybrid vehicle according to an exemplary embodiment of the present invention will be described with reference to FIG. 4. The method as described herein below may be executed by the controller.

First, a switching frequency for initial driving of the HDC 20 may be set to a predetermined value (e.g., about 10 KHz), thereby starting the driving of the HDC 20 (S101). Particularly, a switching operation of the HDC 20 may be executed by applying PWM signals inverted to each other to gates of the respective upper and lower IGBT switching elements 24 and 26. Subsequently, in addition to a temperature of the inductor 22, temperatures of the upper and lower IGBT switching elements 24 and 26 may be sensed (e.g., using various temperature sensors) (S102). In other words, temperature sensing values sensed by the first temperature sensor T1 configured to sense a temperature of the inductor 22, the second temperature sensor T2 configured to sense a temperature of the lower IGBT switching element 26, and the third temperature sensor T3 configured to sense a temperature of the upper IGBT switching element 24 may be input in real time to the controller 40.

Furthermore, the controller 40 may be configured to determine a variation in temperature between the inductor 22 and each of the IGBT switching elements 24 and 26 (S103). When the temperature of the lower IGBT switching element 26, sensed by the second temperature sensor T2, or the temperature of the upper IGBT switching element 24, sensed by the temperature sensor T3, is greater than the temperature of the inductor 22, sensed by the first temperature sensor T1, the controller 40 may be configured to decrease the switching frequency of each IGBT switching element to a predetermined level (e.g., an initial frequency of about 10 KHz to −1 KHz) (S104).

When the temperature of each of the IGBT switching elements 24 and 26 is greater than the temperature of the inductor 22 as described above, the controller may be configured to determine that the temperature of the IGBT switching element is increased based on an amount of switching loss of the IGBT switching element. Thus, the switching frequency of each IGBT switching element may be decreased to a predetermined level, thereby decreasing the temperature of the IGBT switching element. When the switching frequency is continuously decreased to a predetermined level in the controller 40, the controller 40 may be configured to adjust the switching frequency of each IGBT switching element to be fixed to a minimum value (e.g., about 7 KHz) within a critical frequency range by considering output ripples of the converter (S105 and S106).

Additionally, when the temperature of the inductor 22, sensed by the first temperature sensor T1 is greater than the temperature of the lower IGBT switching element 26, sensed by the second temperature sensor T2, or the temperature of the upper IGBT switching element 24, sensed by the temperature sensor T3, the controller 40 may be configured to increase the switching frequency of each IGBT switching element to a predetermined level (e.g., an initial frequency of about 10 KHz to +1 KHz) (S107).

When the temperature of the inductor 22 is greater than the temperature of the lower IGBT switching element 26 or the upper IGBT switching element 24 as described above, it may be considered that heat may be generated in the inductor due to a decrease in switching frequency. Thus, the switching frequency of each IGBT switching element may be increased to a predetermined level, thereby decreasing the temperature of the inductor. When the switching frequency is continuously increased to a predetermined level in the controller 40, the controller 40 may be configured to adjust the switching frequency of each IGBT switching element to be fixed to a maximum value (e.g., about 13 KHz) within the critical frequency range by considering a switching speed of each IGBT switching element (S108 and S109).

As described above, the temperatures of the inductor and the IGBT switching elements, which constitute the HDC, may be detected. When a variation in temperature between the inductor and the IGBT switching element is detected, the switching frequency of the HDC may be variably adjusted to maintain a balance between the temperatures of the inductor and the IGBT switching element. Accordingly, it may be possible to maintain proper use temperatures of the inductor and the IGBT switching element, thereby improving the utilization rate of the IGBT switching element.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A device for controlling a high side direct current/direct current (DC/DC) converter (HDC) of a hybrid vehicle, the device comprising:
    an HDC including an inductor connected to an output terminal of a high-voltage battery, and an upper insulated-gate bipolar transistor (IGBT) switching element and a lower IGBT switching element, configured to switch current flowing through the inductor;
    an element temperature sensing unit including a first temperature sensor configured to sense a temperature of the inductor, a second temperature sensor configured to sense a temperature of the lower IGBT switching element, and a third sensor configured to sense a temperature of the upper IGBT switching element; and
    a controller configured to receive temperature sensing values of the first to third temperature sensors, and in response to detecting a variation in temperature between the inductor and each IGBT switching element, adjust a switching frequency of the IGBT switching element to be increased or decreased to maintain a balance between the temperatures of the inductor and each IGBT switching element.

2. The device of claim 1, wherein the lower IGBT switching element is used for a boost mode of the converter, and the upper IGBT switching element is used for a buck mode of the converter.

3. The device of claim 1, wherein, when the temperature of the lower IGBT switching element, sensed by the second temperature sensor, or the temperature of the upper IGBT switching element, sensed by the third temperature sensor, is greater than the temperature of the inductor, sensed by the first temperature sensor, the controller is configured to decrease the switching frequency to a predetermined level.

4. The device of claim 1, wherein, when the temperature of the inductor, sensed by the first temperature sensor, is greater than the temperature of the lower IGBT switching element, sensed by the second temperature sensor, or the temperature of the upper IGBT switching element, sensed by the third temperature sensor, the controller is configured to increase the switching frequency to a predetermined level.

5. A method for controlling a direct current/direct current (DC/DC) converter (HDC) of a hybrid vehicle, comprising:
    sensing, by a sensing unit, temperatures of a lower insulated-gate bipolar transistor (IGBT) switching element and an upper IGBT switching element, in addition to a temperature of an inductor of an HDC; and
    in response to determining a variation in temperature between the inductor and each IGBT switching element, adjusting, by a controller, a switching frequency of the IGBT switching element to be increased or decreased to maintain a balance between the temperatures of the inductor and each IGBT switching element.

6. The method of claim 5, wherein, in the adjusting of the switching frequency, when the temperature of the lower IGBT switching element or the temperature of the upper IGBT switching element is greater than the temperature of the inductor, the switching frequency is adjusted to be decreased to a predetermined level to decrease the temperature of each IGBT switching element.

7. The method of claim 6, wherein, when the switching frequency is decreased to the predetermined level, the switching frequency is fixed to a minimum value within a critical frequency range, in consideration of output ripples of the converter.

8. The method of claim 5, wherein, in the adjusting of the switching frequency, when the temperature of the inductor is greater than the temperature of the lower IGBT switching element or the temperature of the upper IGBT switching element, the switching frequency is increased to a predetermined level to decrease the temperature of the inductor.

9. The method of claim 8, wherein, when the switching frequency is increased to the predetermined level, the switching frequency is fixed to a maximum value within a critical frequency range, in consideration of a switching speed of each IGBT switching element.

10. A non-transitory computer readable medium containing program instructions executed by a controller to operate a direct current/direct current (DC/DC) converter (HDC) of a hybrid vehicle, the computer readable medium comprising:

program instructions that control a sensing unit to sense temperatures of a lower insulated-gate bipolar transistor (IGBT) switching element and an upper IGBT switching element, in addition to a temperature of an inductor of an HDC; and program instructions that adjust a switching frequency of the IGBT switching element to be increased or decreased to maintain a balance between the temperatures of the inductor and each IGBT switching element in response to determining a variation in temperature between the inductor and each IGBT switching element.

11. The non-transitory computer readable medium of claim 10, wherein when the temperature of the lower IGBT switching element or the temperature of the upper IGBT switching element is greater than the temperature of the inductor, the switching frequency is adjusted to be decreased to a predetermined level to decrease the temperature of each IGBT switching element.

12. The non-transitory computer readable medium of claim 11, wherein, when the switching frequency is decreased to the predetermined level, the switching frequency is fixed to a minimum value within a critical frequency range, in consideration of output ripples of the converter.

13. The non-transitory computer readable medium of claim 10, wherein when the temperature of the inductor is greater than the temperature of the lower IGBT switching element or the temperature of the upper IGBT switching element, the switching frequency is increased to a predetermined level to decrease the temperature of the inductor.

14. The non-transitory computer readable medium of claim 13, wherein, when the switching frequency is increased to the predetermined level, the switching frequency is fixed to a maximum value within a critical frequency range, in consideration of a switching speed of each IGBT switching element.

* * * * *